Oct. 17, 1944.                G. A. RUBISSOW                2,360,368
          DIRECTION AIMING DEVICE FOR AUTOMOBILES,
             SHIPS AND OTHER MOVING VEHICLES
                   Filed Oct. 27, 1941
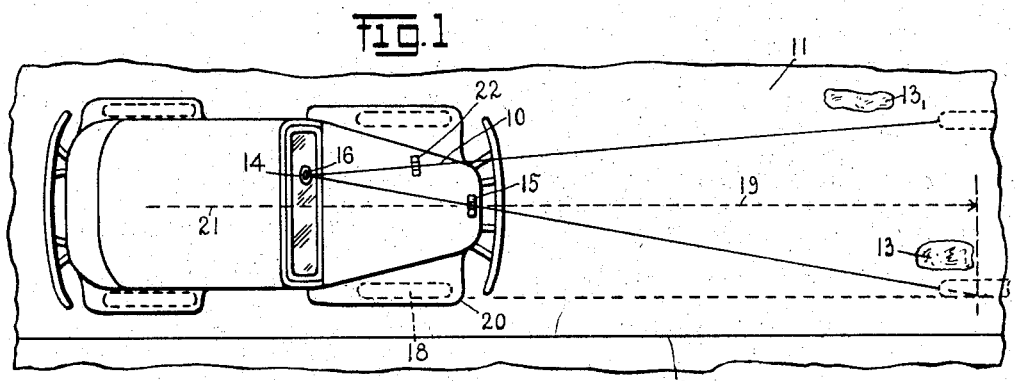
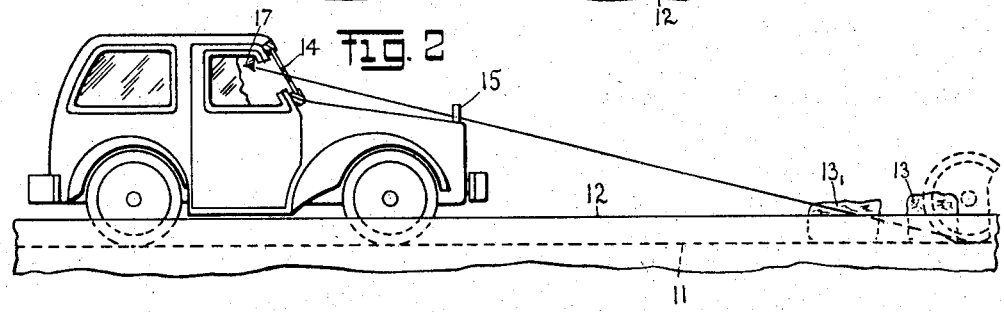
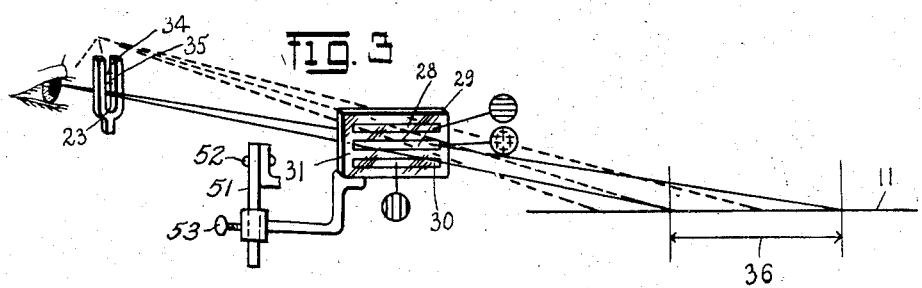
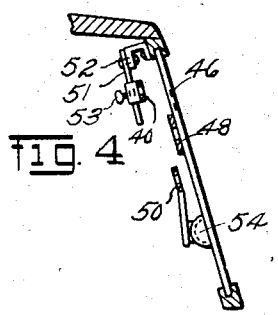
INVENTOR.
George A. Rubissow.

Patented Oct. 17, 1944

2,360,368

UNITED STATES PATENT OFFICE 2,360,368

DIRECTION AIMING DEVICE FOR AUTOMOBILES, SHIPS, AND OTHER MOVING VEHICLES

George A. Rubissow, New York, N. Y.

Application October 27, 1941, Serial No. 416,736

5 Claims. (Cl. 33—46)

This invention provides simple means for a driver of a moving vehicle to register in advance the exact line of travel his vehicle will take.

For simplicity of description, the device will be described only in relation to automobiles, but it is also applicable to trains, trucks, bicycles, motorcycles, ships, motorships, speedboats, aeroplanes, trolley-cars, busses, and all other moving vehicles, in especial military tanks, trucks and other military vehicles.

To avoid hitting an obstacle lying in the pathway of his car, the driver will sometimes swerve too far to the right or left, especially when travelling at a considerable speed, because it is difficult to know the exact course the wheels of his car will take. This sometimes results in loss of control and serious accidents. Or, when meeting another car on a narrow road, the driver will often run his car into a rut or onto the soft shoulder of the road, or onto the sidewalk, into a fence, etc. . . . not knowing how close to the edge he can go to avoid collision.

This device offers assurance to the driver that occurrences such as the two examples cited above, can be met with equanimity and perfect safety.

The above and further objects and novel features will be more fully apparent from the following detailed description when the same is read in connection with the accompanying drawing. It is to be expressly understood, however, that the drawing is for purposes of illustration only and is not intended as a definition of the limits of the invention.

In the drawing wherein like reference characters refer to like parts through the several views, Figure 1 shows a top-plan view of an automobile provided with the device.

Figure 2 shows a side-view of Figure 1.

Figure 3 is a diagrammatical side-view of another embodiment of the device.

Figure 4 is a cross-sectional side-view of an embodiment of the device mounted in the window-pane of the car.

Figures 1 and 2 show one embodiment of the device described herein used on a car 10 travelling along the street 11, the street having a sidewalk 12 and an obstacle 13. The device is shown schematically composed of two members 14 and 15. The member 14 may for instance, be a front-sight made of any material provided with an aperature 16 through which the eye 17 of the driver can see. The member 14 has to be affixed in a predetermined position in respect to the member 15 which serves as the rear-sight. The invention consists in using the principle of a sight or an open sight, peepsight, telescopic sight or any other type of sight in combination with a vehicle, not for aiming at targets, but to visualize exactly the course of the car itself or of its wheels.

This device may be so installed that it will control the path of the wheel 18 and permit the chauffeur to visualize exactly where this wheel will pass for a distance of any desired predetermined length 19, and enabling him as the car approaches the object 13 to guide his car in any desired course with absolute accuracy.

If desired, the device 14—15 may be so installed that instead of visualizing in advance the pathway of the wheel or wheels, it will show the pathway of the fenders 20 or the longitudinal axis of the car 21, the front and rear sights having to be placed accordingly.

In the event that the driver wishes to visualize through the front-sight the path not only of the right wheel but also the left wheel, an additional rear-sight 22 may be provided as shown in Figure 1 or another sight composed of another front and rear sight mounted in an appropriate place.

In practice, one of the simplest embodiments of this device may consist of a rear-sight attached somewhere in the front of the car and a front-sight placed on the front window of the car. The front-sight may, in this case, be painted on the window or be a piece of adhesive material stuck to the front window-pane. The sight's aperture may be V-shaped or U-shaped, as shown on Figure 3, 23, and be painted thereon or made of any material at a predetermined spot in the window-pane. The rear-sight 15 may also be of any form or shape having apertures that are V-shaped or U-shaped. It may have a plurality of slots 28, 29, 30, of a rear-sight 31, Figure 3. The front-sight 24 may be so designed, that while the eye is looking through it a length 33 predetermined by the length of the slot 26 is visualized by the chauffeur on the road 11. The front sight 23 may be graduated by very thin wires or the like, 34, 35, which divides the road when the driver looks through the rear-sight.

If the rear-sight 31 with several slots is employed, each of the slots or only some of them, may be made of glass of different hues which are respectively projected onto the road.

On Figure 3 the projection of the middle slot 29 only is shown, giving a visualized projection 36. The front-sight may be made also of glass on which is painted or etched the desirable forms of sighting.

For military vehicles and speed-boats, it is of the greatest importance to know with absolute precision the boat's course at a sufficient distance in advance. This device will permit visibility in advance of the exact path the car, the wheels, or the sides of the boat will take.

In this specification, the sighting is directed on the road in the main, but this invention is not limited thereto, as the sighting may be directed in the space immediately in front of or behind, or to the sides, permitting heavy trucks or tanks to know in advance if they can pass in tunnels, or over mountain passes, through bridge arcs, etc. The same is also true where ships, planes, speed-boats and the like are concerned.

Having now particularly ascertained and described the nature of the said invention, and the manner in which the same is to be performed, I declare that what I claim is:

1. In a vehicle moving with respect to the ground, a direction-aiming device mounted in said vehicle and comprising a first sight having a peep sight, a second sight made of a material transparent and having parallel stripes painted thereon of a darker or lighter hue than said material, said sights being rigidly mounted at a predetermined distance one from the other in said vehicle, means to so adjust and thereafter maintain the angular position of said sights with respect to said vehicle that the projection of the said stripes will be seen on the said ground in a position substantially parallel to the direction of travel of said vehicle and at a predetermined distance therefrom, whereby the said projection enables the driver to continuously gauge the position of said vehicle with respect to said ground.

2. In a vehicle moving with respect to the ground, a direction aiming device mounted in said vehicle comprising a first sight and a second sight, each said sight being made of a transparent material and having parallel stripes thereon of a darker or lighter hue than the hue of said material, said stripes being made of transparent paint, said sights being rigidly mounted at a predetermined distance one from the other in said vehicle, means to so adjust and thereafter maintain the angular position of said sights with respect to said vehicle that the projection of the said stripes on the ground will be seen in a predetermined desired position in respect to the direction of travel of said vehicle and at a predetermined distance therefrom, whereby the said projection enables the driver to continuously gauge the position of said vehicle with respect to said ground.

3. In a vehicle moving with respect to the ground, a direction-aiming device mounted in said vehicle and comprising a first sight having a peep sight, a second sight made of a transparent material and having transparent parallel stripes thereon of a darker or lighter hue than said material and made of transparent paint, said sights being rigidly mounted at a predetermined distance one from the other in said vehicle, means to so adjust and thereafter maintain the angular position of said sights with respect to said vehicle that the projection of the said stripes on the said ground will be seen through said peep sight in a predetermined desired position in respect to the direction of travel of said vehicle and at a predetermined distance therefrom, whereby the said projection enables the driver to continuously gauge the position of said vehicle with respect to said ground.

4. In a vehicle moving with respect to the ground, a direction-aiming device mounted in said vehicle comprising a first sight and a second sight, each said sight being made of a transparent material and having parallel stripes painted thereon of a darker or lighter hue than the hue of said material, said sights being rigidly mounted at a predetermined distance one from the other in said vehicle, means to so adjust and thereafter maintain the angular position of said sights with respect to said vehicle that the projection of the said stripes on the ground will be seen in a position substantially parallel to the direction of travel of said vehicle and at a predetermined distance therefrom, said stripes being made of a transparent paint.

5. In a vehicle moving with respect to the ground, a direction-aiming device mounted in said vehicle and comprising a first sight having a peep sight, a second sight made of a transparent material, and having parallel stripes painted thereon of a darker or lighter hue than said material, said sights being rigidly mounted at a predetermined distance one from the other in said vehicle, means to so adjust and thereafter maintain the angular position of said sights with respect to said vehicle that the projection of the said stripes will be seen on the ground through said peep sight in a predetermined desired position in respect to the direction of travel of said vehicle and at a predetermined distance therefrom, said stripes being made of a transparent paint.

GEORGE A. RUBISSOW.